(12) United States Patent
Coleman et al.

(10) Patent No.: US 7,918,077 B2
(45) Date of Patent: Apr. 5, 2011

(54) GRASS TREATMENT DEVICES

(75) Inventors: John Coleman, Sheffield (GB); Tom Slater, Sheffield (GB)

(73) Assignee: Advanced Engineering Techniques Limited, Sheffield (GB)

( * ) Notice: Subject to any disclaimer, the term of this patent is extended or adjusted under 35 U.S.C. 154(b) by 0 days.

(21) Appl. No.: 12/518,016

(22) PCT Filed: Dec. 7, 2007

(86) PCT No.: PCT/GB2007/004687
§ 371 (c)(1),
(2), (4) Date: Jul. 9, 2009

(87) PCT Pub. No.: WO2008/068501
PCT Pub. Date: Jun. 12, 2008

(65) Prior Publication Data
US 2010/0064651 A1 Mar. 18, 2010

(30) Foreign Application Priority Data

Dec. 8, 2006 (GB) .................................. 0624545.0
Jul. 19, 2007 (GB) .................................. 0714094.0

(51) Int. Cl.
*A01D 34/62* (2006.01)
(52) U.S. Cl. ........................................................ 56/249
(58) Field of Classification Search ................... 56/11.6, 56/12.8, 12.9, 251, 252, 2, 6, 7, 249, 249.5, 56/294; 474/8, 17, 46, 144–146, 148–150; 172/13–22, 42, 48, 49, 125, 156, 176
See application file for complete search history.

(56) References Cited

U.S. PATENT DOCUMENTS

| 2,283,161 | A | * | 5/1942 | Booton ........................ 56/249.5 |
| 3,783,592 | A | * | 1/1974 | Schraut ......................... 56/13.3 |
| 5,031,335 | A | | 7/1991 | Kimmelman |
| 5,520,253 | A | * | 5/1996 | Kesting ........................ 172/125 |
| 6,647,703 | B2 | * | 11/2003 | Oliver ................................ 56/2 |
| 6,926,091 | B2 | * | 8/2005 | Lee ................................. 172/52 |
| 6,945,021 | B2 | * | 9/2005 | Michel ........................... 56/249 |

FOREIGN PATENT DOCUMENTS

| EP | 1 688 541 B1 | 7/2006 |
| GB | 1 540 217 A1 | 2/1979 |
| GB | 2422764 A | 9/2006 |

OTHER PUBLICATIONS

Combined Search and Examination Report under Sections 17 & 18(3), UK application No. GB 0714094.0, Nov. 20, 2007. International Search Report, WIPO, PCT/GB2007/004687, Mar. 14, 2008.
Written Opinion of the International Searching Authority, WIPO, PCT/GB/2007/004687, Mar. 14, 2008.
International Preliminary Report on Patentability, WIPO, PCT/GB/2007/004687, Mar. 16, 2009.

* cited by examiner

*Primary Examiner* — Robert E Pezzuto
(74) *Attorney, Agent, or Firm* — Meschkow & Gresham, P.L.C.

(57) ABSTRACT

A grass treatment device comprises: a first grass treatment element disposed towards a front portion of the device; a second grass treatment element disposed towards a rear portion of the device; a third grass treatment element disposed substantially between the first and second grass treatment elements, the third element being in the form of a grass cutting tool; and a fourth grass treatment element connectable at a position substantially between the first grass treatment element and the grass cutting tool, the grass treatment elements being elongate and having their longitudinal axes disposed substantially parallel to each other, the grass treatment device characterized in that the fourth grass treatment element is configured to be displaced from the position located between the first grass treatment element and the grass cutting tool in order to enable the first grass treatment element to substantially occupy the position.

16 Claims, 5 Drawing Sheets

GRASS TREATMENT DEVICES

FIELD OF THE INVENTION

The present invention relates to the field of grass treatment devices and in particular the invention relates to a grass treatment device having an improved grass cutting and grooming assembly such that the grass is lifted prior to cutting.

BACKGROUND TO THE INVENTION

Grass treatment machines are used for treating grass surfaces such as lawns, golf courses, playing fields and parkland. Various types of grass treatment machines exist and include, but are not limited to, mowers, rollers, scarifiers and spikers. As is known to those skilled in the art typically such machines include one or more grass treatment devices or heads, each device comprising one or a plurality of grass treatment tools. For many prior art grass treatment machines, such as, for example, those manufactured by John Deere, Toro, or Jacobsen, a plurality of grass treatment devices (typically two or three) are mounted on a given machine. A common configuration of three such grass treatment devices is such that they are mounted in a reverse echelon disposition: two grass treatment devices are mounted at the front of the machine with the third being mounted substantially immediately behind the first two.

Those skilled in the art will understand that in recent years improved varieties of grass have been bred for use as sports surfaces. In particular improved varieties of grass have been specifically bred for use on fairways and/or putting greens of golf courses and it is known that these grasses have become increasingly dense growing in comparison to earlier forms of grass. In relation to the improved grasses, generally known as ultra dense dwarf grasses, this means that the number of grass shoots per unit area is greater than with previous types of grass. Ultra dense dwarf grasses allow the grass to be cut to very low heights, which in turn allows greens and fairways to be faster, as regards the speed of travel of a golf ball disposed thereon, than has ever been previously possible. Examples of these new high-density grasses include cultivars of Bermuda Grass and Creeping Bent.

A disadvantage associated with the use of the new denser grass varieties are that they produce a large amount of organic matter and are also prone to lateral (as opposed to purely vertical) growth thereby leaving a so-called "nap". These two conditions are exacerbated by the very dense or tight packed nature of the grass shoots.

In order to reduce the propensity for the grass to exhibit lateral growth a grass treatment tool known to those skilled in the art as a "groomer" has been developed. As those skilled in the art will appreciate a "groomer" typically comprises a toothed blade assembly that is made of a suitable metal and configured to lift up the grass blades such that they generally extend in direction that is closer to vertical than before grooming. A known type of groomer comprises 90 metal tipped blades spaced 5 mm apart that project axially out from the rotating shaft upon which they are mounted. The groomer works by disrupting the grass and an upper portion of the grass surface where it is growing via the action of the rotating metal tipped blades interacting with this surface. The action of these blades thins out the grass and thereby aids the grass blades to extend vertically as opposed to having a lateral component and furthermore reduces the tendency of the grass to exhibit lateral growth.

In contrast to a groomer tool a "brush" is a grass treatment tool that typically comprises a non-metallic blade configured to pick up and remove debris from the grass. Those skilled in the art will also appreciate that there are further kinds of treatment tools that are not cutting tools or rolling tools, a well known example being a tender conditioner unit (TCU).

Problems exist in trying to combine grooming and other grass treatment functions in a single grass treatment device as will now be described. Conventional grass treatment devices operate using a first treatment tool in the form of a roller or a so-called "skid plate" and a second treatment tool in the form of a roller. In between the first and second rollers there is typically a third treatment tool in the form of a cylindrically shaped cutting device known as a cutting reel. The first roller that is positioned at the front of a conventional grass treatment device acts to flatten the grass as it rolls over the grass surface. As the grass treatment device moves forwards the cutting reel then engages and cuts the grass blades that have been rolled by the first roller. Following cutting by the cutting reel the second roller that is positioned behind the cutting reel flattens the resultant cut and uncut grass stalks.

The distance between the first and second rollers is key as a significant problem with in particular the cutting of grass surfaces is the damage of a grass surface by the cutting of such a surface too deeply, this is known as scalping. Most normally caused by the action of the cutting reel digging into such a grass or turf surface and effectively up-rooting all or a portion of the grass in this region.

The cutting reel can be displaced out of position with respect to the grass surface when the surface changes pitch or becomes uneven. This is particularly the case when the first and second rollers which act to position the rotational cutting tool are on a portion of the cutting surface that is not at the same orientation as the region of the surface that the cutting reel is over. The distance between the first and second rollers is known as the "footprint" of the grass treatment device. In general therefore the shorter the distance between the first and second rollers (i.e. the smaller the footprint) the greater the cutting tool (or other treatment element which is positioned between the rollers) conforms to the contours of the grass surface which is being treated. Conversely the larger the distance between the rollers the greater the likelihood that the grass treatment tool positioned between the two rollers may be displaced from its optimum position with respect to the grass surface and so damage this surface when in use. As will be appreciated by those skilled in the art the cutting reel is not knocked out of position when the distance between the rollers is too great. What occurs is the scalping referred to earlier. In effect the reel cuts deep in to the turf canopy injuring the grass.

In view of the increase in use of the ultra dense dwarf grasses mentioned above there is increasingly a need to groom grass before it is cut so as to enable the grass to be cut more effectively. However prior art grass treatment devices known to the inventors of the present invention basically either comprise (a) two rollers and a cutting tool or (b) comprise two rollers, a cutting tool and a groomer tool located in between the two rollers. The problem with these known devices are as follows.

For optimum grass to be provided a given owner of a grassed area, such as a golf course, would need a type (a) device and a type (b) device. A problem with this is that requiring both types of devices is expensive. If the given owner cannot afford or justify such expenditure then the grass owner has to choose between purchasing a device that does not groom (type a) or a type (b) device. As will be understood by those skilled in the art known type (b) devices are more expensive than type (a) devices. Furthermore prior art type (b) devices have a greater footprint than type (a) devices in view of the fact that a groomer tool (or another tool, such as, for example, a brush) is disposed between the front roller and the cutting tool element.

In conclusion it is known to provide a grass treatment device that cuts and grooms, but this means that the device cannot safely cut grass as low without scalping.

In view of the above there is a need to provide an improved grass treatment device that enables multiple grass treatment functions, in particular, but not exclusively grooming and cutting, to be readily deployed by a single grass treatment device.

SUMMARY OF THE INVENTION

An object of the present invention is to provide a grass treatment device that cuts and grooms grass whilst minimizing damage to the grass surface that is being treated.

Another object of the present invention is to provide a grass treatment device that readily permits a first mode of operation as a grass groomer and a second mode of operation as a grass cutter whilst minimizing scalping. By readity it is meant herein that the change between operational modes should take as little time as possible and preferably be of the order of 10 minutes or less.

A further object of the present invention is to provide a grass treatment device comprising a cutting element positioned between a front roller element and a rear roller element, said device comprising means for altering the distance between said front roller and said cutting element in order to enable a demountable groomer element to be inserted in between said cutting element and said front roller.

According to a first aspect of the present invention there is provided a grass treatment device comprising:

a first grass treatment element disposed towards a front portion of said device;

a second grass treatment element disposed towards a rear portion of said device;

a third grass treatment element disposed substantially between said first and said second grass treatment elements, said third element being in the form of a grass cutting tool; and a fourth grass treatment element connectable at a position substantially between said first grass treatment element and said grass cutting tool;

said grass treatment elements being elongate and having their longitudinal axes disposed substantially parallel to each other, said grass treatment device characterised in that said fourth grass treatment element is configured to be displaced from said position located between said first grass treatment element and said grass cutting tool in order to enable the distance between the longitudinal axis of said first grass treatment element and the longitudinal axis of said grass cutting tool to be adjusted.

Preferably said first treatment element comprises a front roller.

Preferably said second element comprises a rear roller.

Preferably said fourth treatment element comprises a groomer.

Preferably said fourth element is detachably connected to said device to provide said displacement.

Preferably said fourth element is coupled to a sliding mechanism to enable said displacement of said fourth element.

Alternatively said fourth treatment element comprises a brush.

Preferably said first treatment element comprises a roller connected to said treatment device by at least one pivot.

Preferably said first treatment element comprises a roller assembly having at least one attachment mechanism configured to engage and attach said roller to an attachment means located at a first position on said device and to at least a second position.

Preferably said at least one attachment mechanism is positioned on either end of said first roller.

Preferably said first treatment element is configured to move between a plurality of positions.

Preferably said grass treatment device further comprises adjustment means configured to allow an adjustment of a distance between said fourth treatment element and said first treatment element, said adjustment capable of affecting a distance between said fourth treatment element and a grass surface being treated.

Suitably said means to adjust comprises a threaded bolt.

Preferably said device comprises an electric motor.

Preferably said device comprises an internal combustion engine.

According to a second aspect of the present invention there is provided a grass treatment device comprising:

a first roller disposed upon a front portion of said device;

a second roller disposed upon a rear portion of said device;

a grass treatment cutting tool disposed between said first roller and said second roller;

a grass grooming tool connectable between said grass cutting tool and said first roller;

characterised in that said first roller is configured to move from a first position on said device to at least a second position on said device wherein in said second position said first roller is closer to said grass cutting tool than in said first position.

Preferably said first roller is connected to said treatment device by at least one pivot.

Preferably said first roller further comprises at least one attachment mechanism configured to engage and attach said first roller to an attachment means located at said first position and said second position.

Preferably said at least one attachment mechanism is positioned on either end of said first roller.

Preferably said first roller is configured to move between a plurality of positions.

Preferably said grass treatment device comprises adjustment means configured to allow an adjustment of a distance between said treatment tool and said first roller, said adjustment capable of affecting a distance between said tool and said grass surface.

Preferably said adjustment means further comprises graduation means configured to indicate to a user predetermined quantized intervals of said distance between said tool and said grass surface.

Preferably said means to adjust the height of said first roller relative to said second roller comprises a threaded bolt.

Preferably said grass treatment device comprises an electric motor.

Preferably said grass treatment device comprises an internal combustion engine.

According to a third aspect of the present invention there is provided a grass treatment device comprising:

a first grass treatment element disposed towards a front portion of said device;

a second grass treatment element disposed towards a rear portion of said device;

a third grass treatment element grass disposed substantially between said first and said second grass treatment elements, said third element being in the form of a grass cutting tool; and a fourth grass treatment element connectable at a first position substantially between said first grass treatment element and said grass cutting tool;

said grass treatment elements being elongate and having their longitudinal axes disposed substantially parallel to each other, said grass treatment device characterised in that:

said grass treatment device comprises a first mode of operation wherein said fourth grass treatment element is disposed substantially between said first grass treatment element and said grass cutting tool to thereby enable said grass treatment device to operate in accordance with the function of said fourth element; and said grass treatment device comprises a second mode of operation wherein said fourth grass treatment element is displaced from said first position to a second position, said second position substantially not between said first treatment element and said grass cutting tool, said grass treatment device thereby configured to cut grass.

said grass treatment device characterised in that said fourth grass treatment element is configured to be displaced from said position located between said first grass treatment element and said grass cutting tool in order to enable the distance between the longitudinal axis of said first grass treatment element and the longitudinal axis of said grass cutting tool to be adjusted.

According to a fourth aspect of the present invention there is provided a grass treatment device comprising a cutting element positioned between a front roller element and a rear roller element, said device comprising means for altering the distance between said front roller and said cutting element in order to enable a demountable groomer element to be inserted in between said cutting element and said front roller.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

Figure 1:
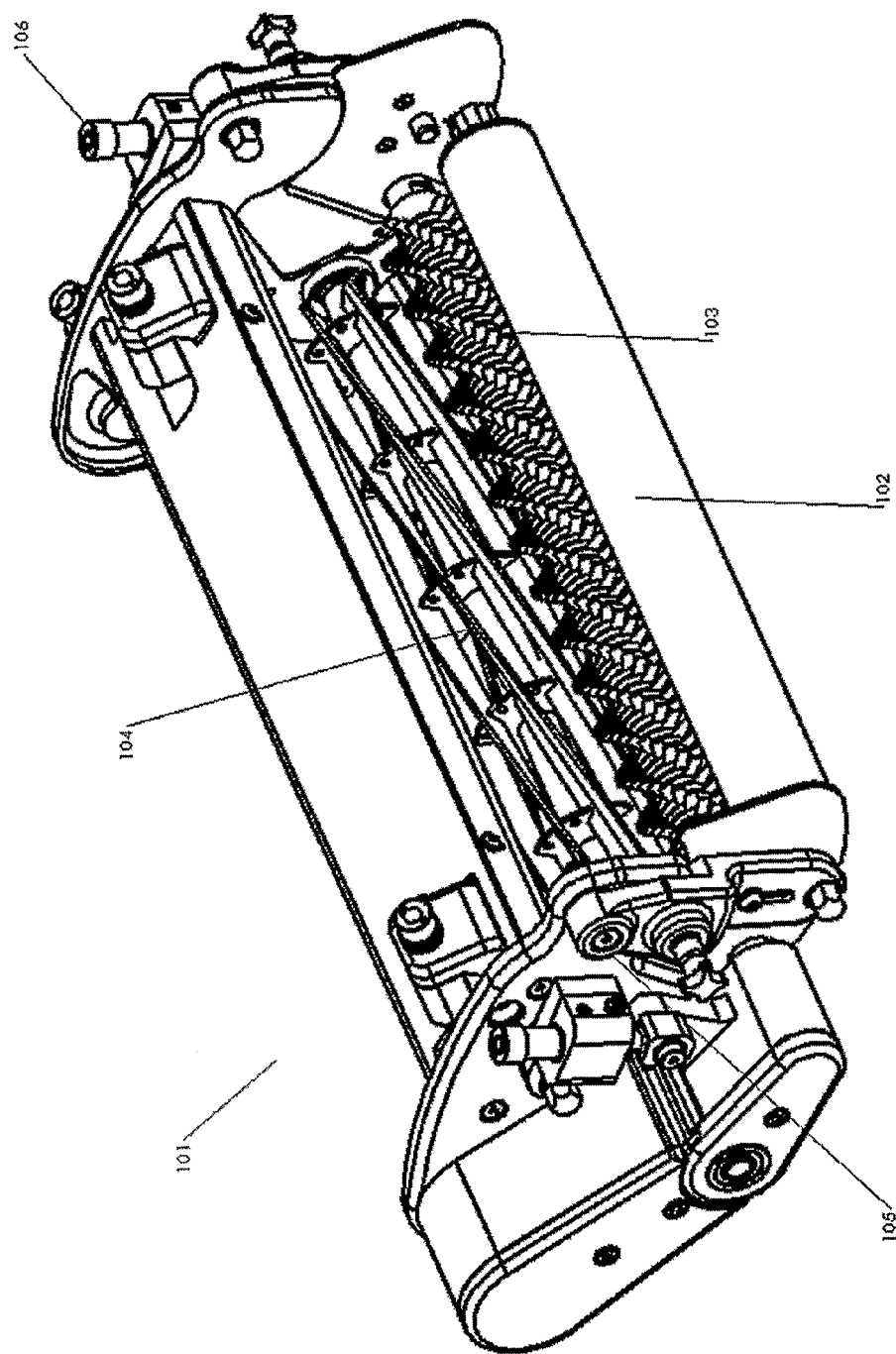
FIG. 1 illustrates schematically in perspective view a grass treatment device according to a first aspect of the present invention in a first configuration.
Figure 5:
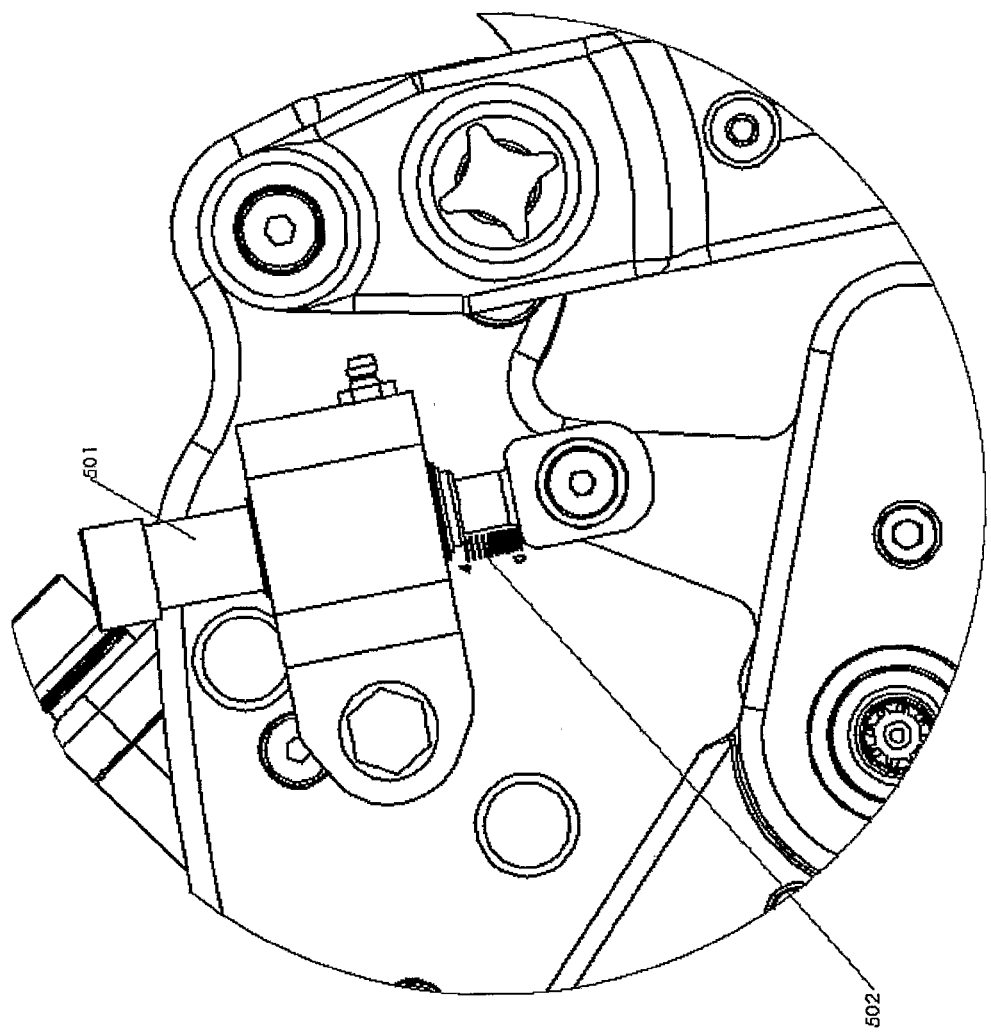

In accordance with the present invention FIG. 5 schematically illustrates a detailed side elevation view of the height adjustment mechanism 106 of FIG. 1 for raising and lowering groomer unit 103.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 2:
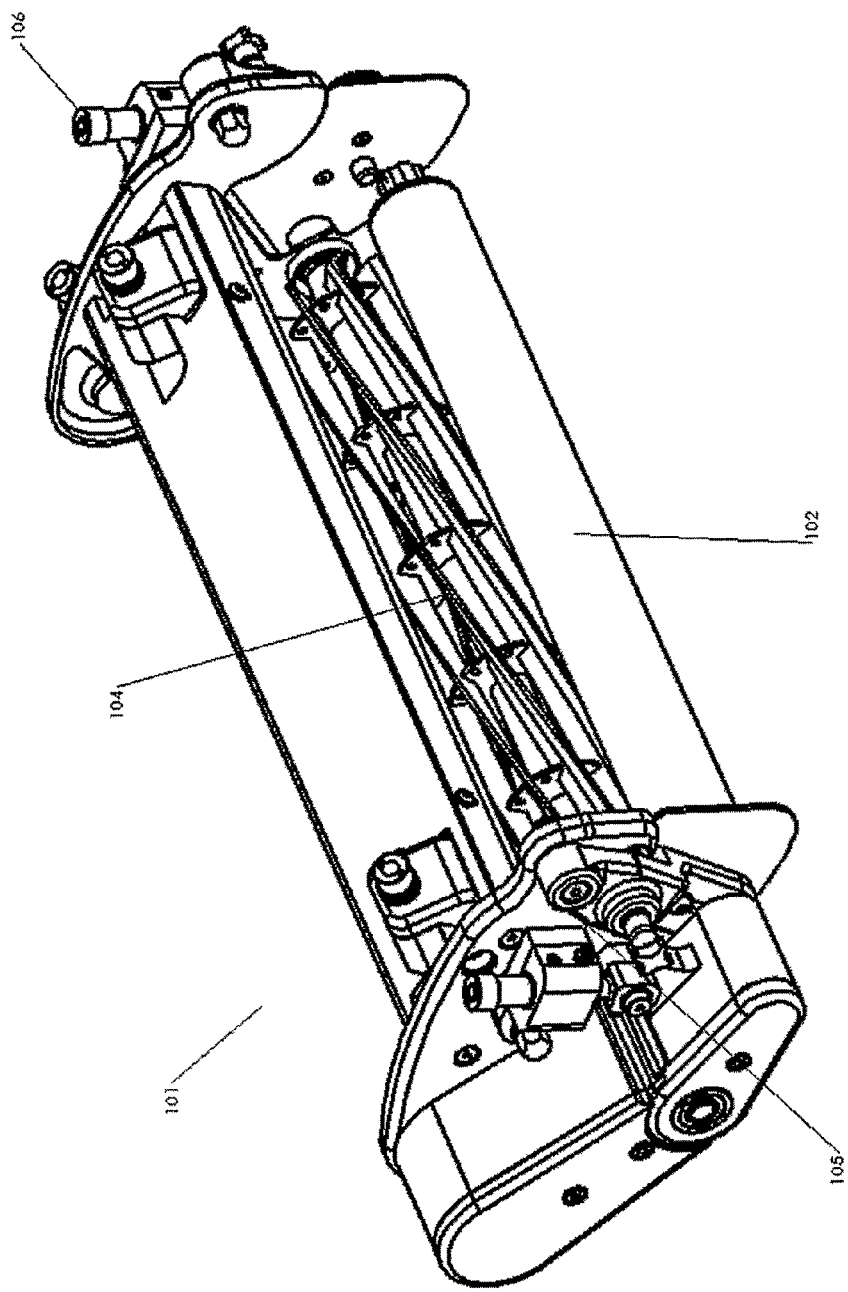
FIG. 2 illustrates schematically in perspective view a grass treatment device according to a first aspect of the present invention in a second configuration.

With reference to FIG. 1 and FIG. 2 there is shown a grass treatment device in perspective view as configured in accordance with the best mode of the present invention. Grass treatment device 101 is configured to rest on and travel along a grass surface that is required to be treated in some way. In accordance with this preferred embodiment of the present invention device 101 comprises a grass treatment element in the form of a front roller 102, a grass treatment element in the form of a groomer unit 103 and a grass treatment element in the form of a cutting tool 104. The device is configured to move in a direction from element 104 towards front roller element 102. The device also comprises a further grass treatment element in the form of a rear roller that is not shown in FIG. 1. The rear roller is located behind cutting element 104 and is located at the opposite side of the device to the front roller 102. Treatment elements 102-104 and the rear roller are all substantially cylindrical bodies configured to roll in the direction of motion of device 101.

In accordance with the present invention FIG. 1 schematically illustrates device 101 with front roller 102 in a forward position thereby facilitating insertion of groomer unit 103 immediately behind. Thus groomer unit 103 is positioned substantially between front roller 102 and cutting element 104 and is thus in the position for performing grooming.

In accordance with the present invention FIG. 2 schematically illustrates device 101 with front roller 102 in a backward position, the groomer unit 103 having been detached (removed) from device 101.

Grass treatment device 101 comprises a housing, which itself is made up of a set of first roller attachment points for attaching said first roller to the housing such that the first roller can rotate about its main longitudinal axis. The housing also comprises a set of second roller attachment points for attaching the second (rear) roller to the housing such that the second roller can rotate about its longitudinal axis.

The housing also comprises a first roller height adjustment mechanism located close to each first roller attachment point. The first roller height adjustment mechanism is used to adjust the height of the first roller when in use. By adjusting the height of the first roller, the height of grass treatment device 101 relative to a given grass surface being treated can be adjusted. This is useful for controlling, for example, the height of mowing and/or the depth of grooming and/or brushing that may be required.

The housing also comprises a height adjustment mechanism configured to raise and lower the groomer unit 103. This height adjustment mechanism allows the groomer to be lowered or raised independently of the other components of the grass treatment head 101 so allowing various combinations of cut and groom heights depending upon the specific effect a greens keeper wishes to achieve.

As will be appreciated by those skilled in the art a number of alternative height adjustment mechanisms and grass treatment element fixing means may be used in place of those described herein.

Figure 3:
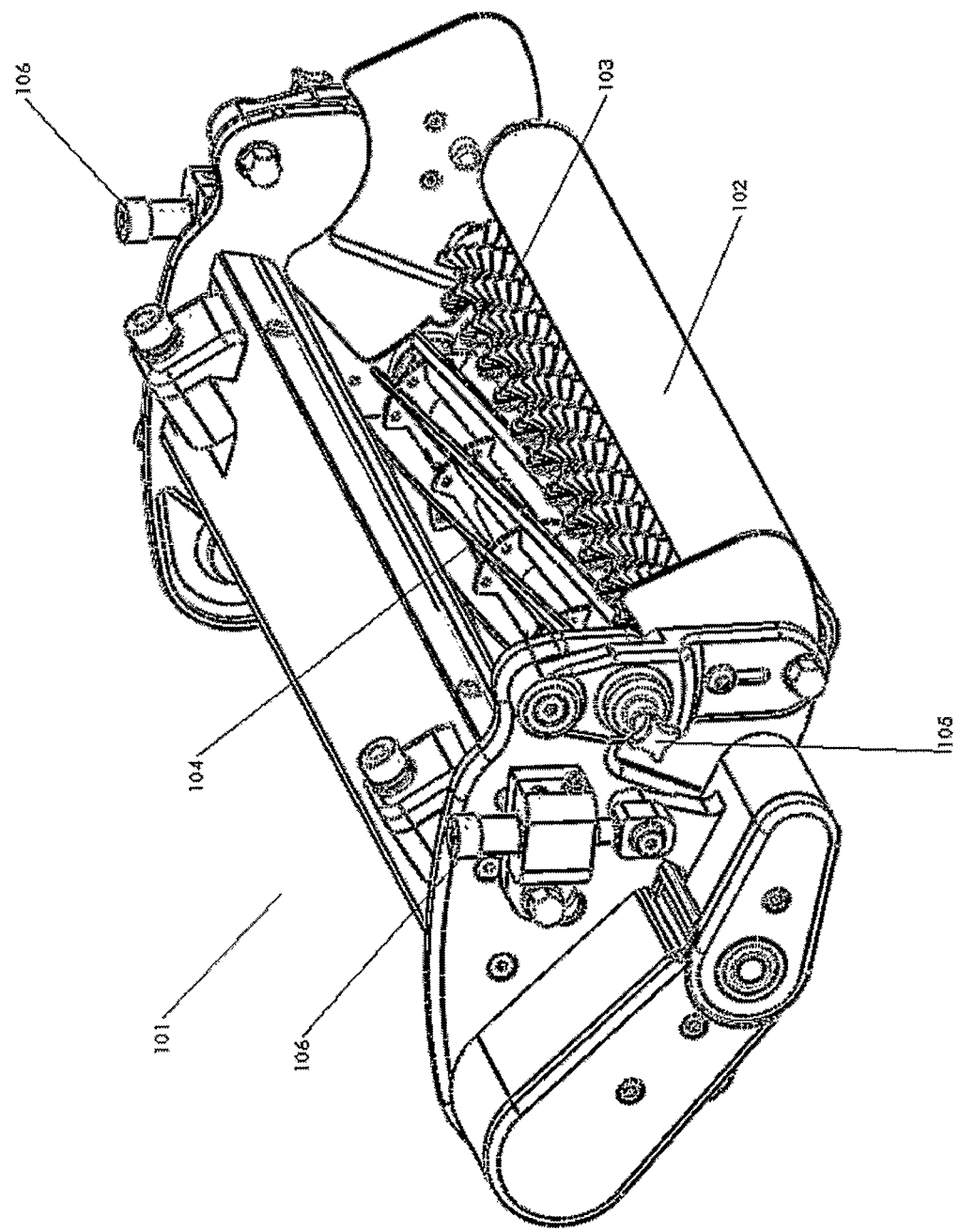
FIG. 3 further illustrates schematically in perspective view a grass treatment device according to a first aspect of the present invention in the first configuration of FIG. 1, but from a slightly different angle of view.

FIG. 3 further illustrates schematically in perspective view a grass treatment device according to a first aspect of the present invention in the first configuration of FIG. 1, but from a slightly different angle of view. In FIG. 3 a height adjuster 106 is shown at each opposing side of the device.

Figure 4:
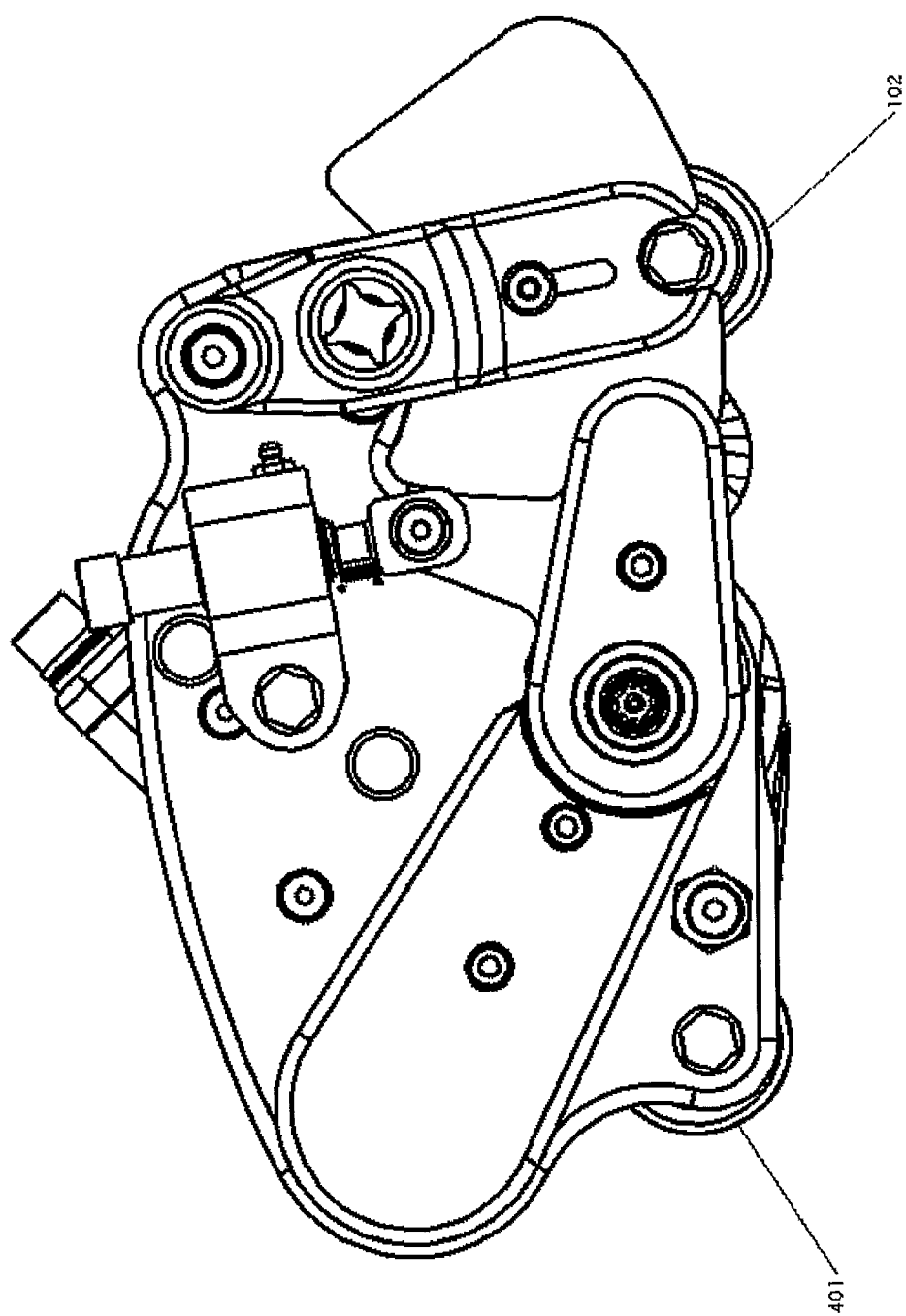
FIG. 4 is a side elevation view of FIG. 3 with groomer unit 103 in position between front roller 102 and cutting element 104.

FIG. 4 is a side elevation view of FIG. 3 with the groomer unit in position between front roller 102 and cutting element 104. At the rear side of the device rear roller 401 is illustrated in FIG. 4.

In accordance with the present invention FIG. 5 schematically illustrates a detailed side elevation view of the height adjustment mechanism 106 for raising and lowering groomer unit 103. As shown the height adjustment mechanism comprises a rotatable knob 501, which when turned lowers or raises groomer element 103 relative to the heights above ground level of the other treatment elements of grass treatment device 101. There is also provided a graduated scale 502 configured to enable an operator of device 101 to accurately determine the amount of adjustment that either has been made to the groomer's height or that is required to be made.

The first roller and groomer height adjustment mechanisms according to the preferred embodiment of the present invention illustrated in FIGS. 1-5 each comprise a threaded bolt and a nut configured to raise or lower the first roller and groomer as required by the operator.

With reference to FIG. 1 and FIG. 2 the preferred height adjuster mechanism comprises an adjuster position on either side of the groomer mechanism. By turning an upper groomer height adjuster, this causes a cylindrical mechanism to extend or retract so raising or lowering the groomer element with respect to the front and/or rear rollers.

The front and rear rollers of grass treatment device 101 are configured so as to be in contact with a grass surface when the device is in use. The front and rear rollers are also configured so as to respectively position groomer element 103 and cutting element 104 when the device is in use.

In accordance with the preferred embodiment of the present invention as illustrated in FIGS. 1-5 device 101 comprises a cutting head or cutting reel 104 positioned in front of the rear roller (not shown), next to and behind the groomer unit 103. Groomer element 103 is located behind front roller 102. Grass treatment device 101 is therefore configured to cut the grass blades which make up the grass surface over which the device 101 and its associated grass treatment elements move.

Groomer unit 103 comprises a plurality of metal blades spaced equidistantly apart and in a staggered formation around the periphery of a centrally and longitudinally disposed cylindrical member which is free to rotate in the grass treatment device. Rotation of the groomer unit 103 is the result of transmission of a motive force from an associated motor unit present on a grass treatment machine (not shown in FIG. 1) in relation to which grass treatment device mechanically communicates. This same traction unit also powers cutting reel treatment element 104. The groomer and cutting reel can rotate in the same direction or alternatively in contrary directions. Likewise the cutting reel and groomer can be powered so as to revolve at different speeds or at identical speeds.

FIG. 1 this shows grass treatment device 101 in a first configuration. With reference to FIG. 2, there is shown this same grass treatment device in a second configuration in which the groomer unit 103 has been removed and the front roller 101 has been moved inwards towards grass cutting reel element 104 in order to reduce the footprint of the treatment head 101. In this respect FIGS. 1 and 2 represent the best mode of performing the present invention.

In accordance with the preferred embodiment of the present invention the groomer unit 103 is fitted to the housing via a set of bolts positioned on either end of the groomer. However as will be understood by those skilled in the art any other suitable fixing means may be used to attach the groomer to the treatment device 101.

In accordance with another specific embodiment, the groomer is positioned in the overall cutting apparatus using a set of several washers at either end, these washers being held in place by a cover unit that is easily removed again at either end. Several different ways however have been envisaged by the application in respect of this technology and the invention described herein is not to be considered as limited to the specific preferred embodiment described with reference to the accompanying drawings. For other details relating to the technology reference is made to the figure enclosed herein.

In the second configuration, representing a mode of operation for cutting grass, groomer 103 has been removed from treatment device 101 and the front or first roller 102 has been moved such that it occupies a similar or identical position to the former position of groomer unit 103 (that of the groomer element in FIG. 1). Roller 102 is fitted in this position so decreasing the footprint of the unit, that is the distance between the first and second rollers.

To change configurations between grooming functionality (FIG. 1) and cutting functionality (FIG. 2) there is provided a quick release knob 105, on either side of treatment device 101. By pulling knobs 105 outwards, this disengages an internal locking mechanism associated with the front roller 102 and allows the front roller 102 to move about a pivot point formed onto the casing of device 101 from a first to a second position as shown in FIGS. 1 and 2. Knobs 105 are able to reengage at the end of this arc of movement so locking the front roller into place in the second position. In accordance with further aspects of the present invention there may be provided several positions at which the knobs can engage and so lock the front roller in a range of positions. In addition to knob 105 there is also provided a groomer height adjustment mechanism 106 for adjusting the height of the groomer for a particular surface being treated.

More generally in accordance with the present invention there is thus provided a grass treatment device comprising:

a first grass treatment element disposed towards a front portion of said device;

a second grass treatment element, such as a rear roller, disposed towards a rear portion of said device;

a third grass treatment element disposed substantially between said first and said second grass treatment elements, said third element being in the form of a grass cutting tool; and a fourth grass treatment element in the form of a groomer 103 or a brush connectable at a position substantially between said first grass treatment element and said grass cutting tool;

said grass treatment elements being elongate and having their longitudinal axes disposed substantially parallel to each other, wherein said fourth grass treatment element is configured to be displaced from said position located between said first grass treatment element and said grass cutting tool in order to enable the distance between the longitudinal axis of said first grass treatment element and the longitudinal axis of said grass cutting tool to be adjusted.

In the preferred embodiment the first grass treatment element mentioned in the last paragraph may comprise a front roller (102) or a skid plate. In the best mode the adjustment of the distance specified comprises a decrease in said distance when the groomer is displaced from its grooming position between the front roller (102), or in the alternative, a skid plate, and the cutting element 104.

Suitably front roller 102 is, in the best mode contemplated, configured to move relative to cutting element 104 on displacement of groomer 103 from its grooming position that is located substantially between the longitudinal axes of front roller 102 and cutting element 104. However those skilled in the art will appreciate that the reverse situation will also solve the technical problem addressed by the present invention: that is that the cutter element 104 may be configured to move relative to groomer 103. Alternatively both groomer 103 and cutting element 104 may be configured to move relative to each other.

In the preferred embodiment groomer element 103 is detachable from device 101 so as to enable movement of one or more of the neighbouring treatment elements 102 and 104. However groomer element 103 may be configured to slide along a slide member (not shown) such that it does not require to be completely detached from device 101. Such a slide member may, for example, suitably be configured to enable groomer 103 to slide to a position substantially above cutter 104.

The invention claimed is:

1. A grass treatment device comprising:
a first grass treatment element disposed towards a front portion of said device;
a second grass treatment element disposed towards a rear portion of said device;
a third grass treatment element disposed substantially between said first and said second grass treatment elements, said third element being in the form of a grass cutting tool; and
a fourth grass treatment element connectable at a first position substantially between said first grass treatment element and said grass cutting tool;
said grass treatment elements being elongate and having their longitudinal axes disposed substantially parallel to each other,
said grass treatment device characterized in that said fourth grass treatment element is configured to be readily displaced from said first position located between said first grass treatment element and said grass cutting tool in order to thereby enable the first grass treatment element to substantially occupy said first position.

2. A grass treatment device as claimed in claim 1 wherein said first treatment element comprises a front roller.

3. A grass treatment device as claimed in claim 1 wherein said second element comprises a rear roller.

4. A grass treatment device as claimed in claim 1 wherein said fourth treatment element comprises a groomer.

5. A grass treatment device as claimed in claim 1 wherein said fourth element is detachably connected to said device to provide said displacement.

6. A grass treatment device as claimed in claim 1 wherein said fourth element is coupled to a sliding mechanism to enable said displacement of said fourth element.

7. A grass treatment device as claimed in claim 1 wherein said fourth treatment element comprises a brush.

8. A grass treatment device, as claimed in claim 1 wherein said first treatment element comprises a roller connected to said treatment device by at least one pivot.

9. A grass treatment device, as claimed in claim 1, wherein said first treatment element comprises a roller assembly having at least one attachment mechanism configured to engage and attach said roller assembly to an attachment means located at a second position on said device and to at least a third position.

10. A grass treatment device, as claimed in claim 1, wherein said first treatment element comprises a roller assembly having at least one attachment mechanism configured to engage and attach said roller assembly to an attachment means located at a second position on said device and to at least a third position and wherein said at least one attachment mechanism is positioned on either end of said first roller assembly.

11. A grass treatment device, as claimed in claim 1, wherein said first treatment element is configured to move between a plurality of positions.

12. A grass treatment device as claimed in claim 1, further comprising adjustment means configured to allow an adjustment of a distance between said fourth treatment element and said first treatment element, said adjustment capable of affecting a distance between said fourth treatment element and a grass surface being treated.

13. A grass treatment device as claimed in claim 1, further comprising adjustment means configured to allow an adjustment of a distance between said fourth treatment element and said first treatment element, said adjustment capable of affecting a distance between said fourth treatment element and a grass surface being treated and wherein said means to adjust comprises a threaded bolt.

14. A grass treatment device as claimed in claim 1 wherein said device comprises an electric motor.

15. A grass treatment device, as claimed in claim 1, comprising an internal combustion engine.

16. A grass treatment device as claimed in claim 1, further comprising adjustment means configured to allow an adjustment of a distance between said fourth treatment element and said first treatment element, said adjustment capable of affecting a distance between said fourth treatment element and a grass surface being treated and wherein said adjustment means further comprises graduation means configured to indicate to a user predetermined quantized intervals of said distance between said tool and said grass surface.

* * * * *